(12) United States Patent
Mans

(10) Patent No.: US 8,548,319 B1
(45) Date of Patent: Oct. 1, 2013

(54) CAMERA LENS SHADE ASSEMBLY

(76) Inventor: John Mans, Boulder, CO (US)

( * ) Notice: Subject to any disclaimer, the term of this patent is extended or adjusted under 35 U.S.C. 154(b) by 0 days.

(21) Appl. No.: 13/539,679

(22) Filed: Jul. 2, 2012

Related U.S. Application Data

(63) Continuation-in-part of application No. 13/198,871, filed on Aug. 5, 2011, now abandoned.

(60) Provisional application No. 61/371,628, filed on Aug. 6, 2010.

(51) Int. Cl.
*G03B 11/00* (2006.01)

(52) U.S. Cl.
USPC .......................................................... 396/544

(58) Field of Classification Search
USPC ................................. 396/419, 544
See application file for complete search history.

(56) References Cited

U.S. PATENT DOCUMENTS

| D411,853 S | * | 7/1999 | Cieslikowski | D16/219 |
| RE36,883 E | * | 9/2000 | Krenzel | 362/191 |
| 2005/0151851 A1 | * | 7/2005 | Schnell | 348/208.4 |

* cited by examiner

*Primary Examiner* — Clayton E Laballe
*Assistant Examiner* — Noam Reisner

(57) ABSTRACT

A camera lens shade assembly includes an elongated member having a first end and a second end. The elongated member includes a plurality of attached ball and socket members and is bendable such that first and second ends are positionable with respect to each other. An attachment member is attached to the first end of the elongated member. The attachment apparatus is removably coupled to an image capturing device. A shade is attached to the second end of the elongated member. The shade is positionable relative to a lens of the image capturing device to inhibit light from a selected light source from directly entering the lens.

12 Claims, 5 Drawing Sheets

CAMERA LENS SHADE ASSEMBLY

CROSS-REFERENCE TO RELATED APPLICATIONS

This application is a continuation in part of U.S. patent application Ser. No. 13/198,871 filed on Aug. 5, 2011, now abandoned which further takes benefit of U.S. Provisional Application No. 61371628 filed on Aug. 6, 2010.

BACKGROUND OF THE DISCLOSURE

Field of the Disclosure

The disclosure relates to lens shade devices and more particularly pertains to a new lens shade device for preventing a light source from directly entering a front side of a camera lens.

SUMMARY OF THE DISCLOSURE

An embodiment of the disclosure meets the needs presented above by generally comprising an elongated member having a first end and a second end. The elongated member includes a plurality of attached ball and socket members and is bendable such that first and second ends are selectively positionable with respect to each other. An attachment member is attached to the first end of the elongated member. The attachment apparatus is configured to be removably coupled to an image capturing device. A shade is attached to the second end of the elongated member. The shade is selectively positionable relative to a lens of the image capturing device to inhibit light from a selected light source from directly entering the lens.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
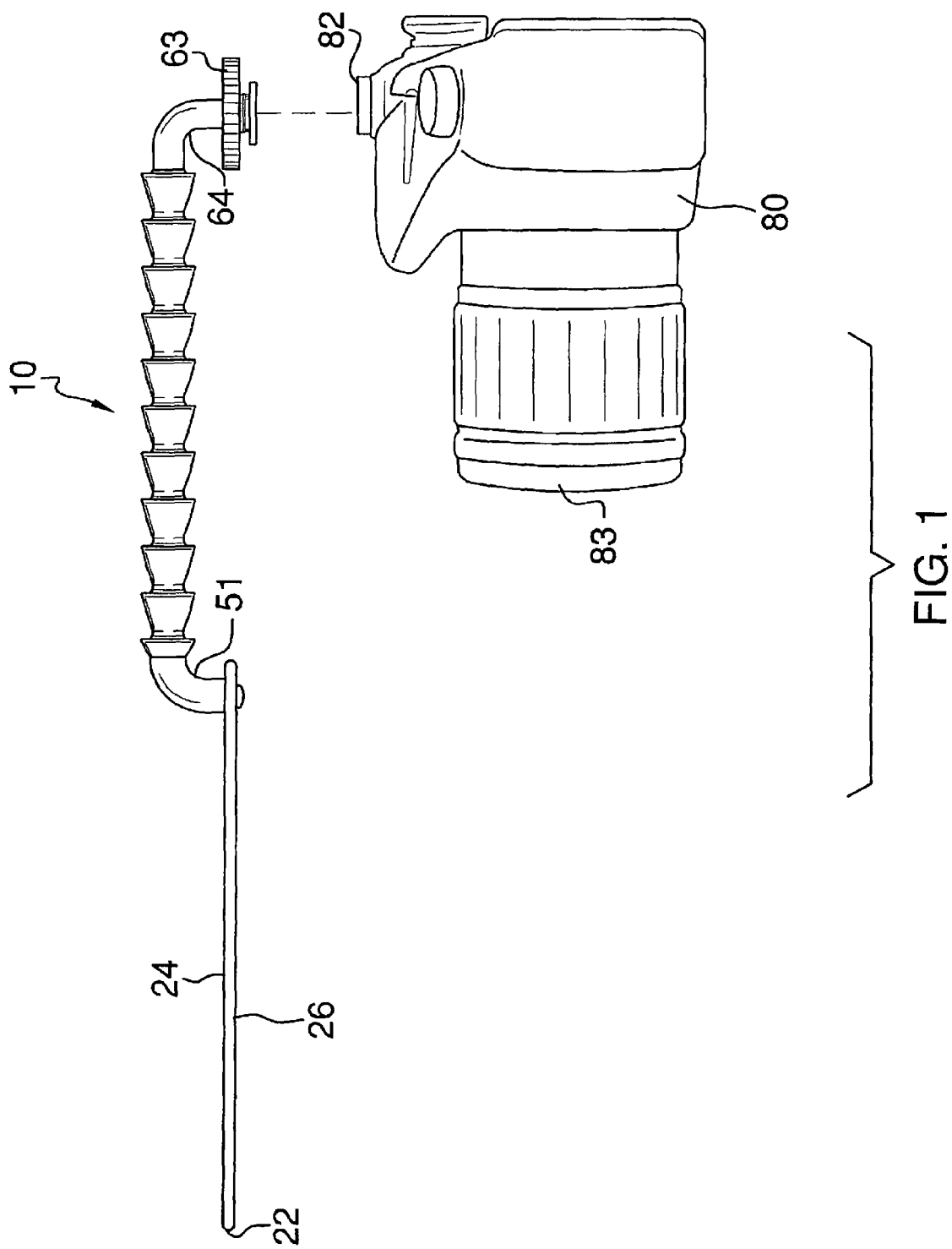
FIG. 1 is a side view of a camera lens shade assembly according to an embodiment of the disclosure.
Figure 2:
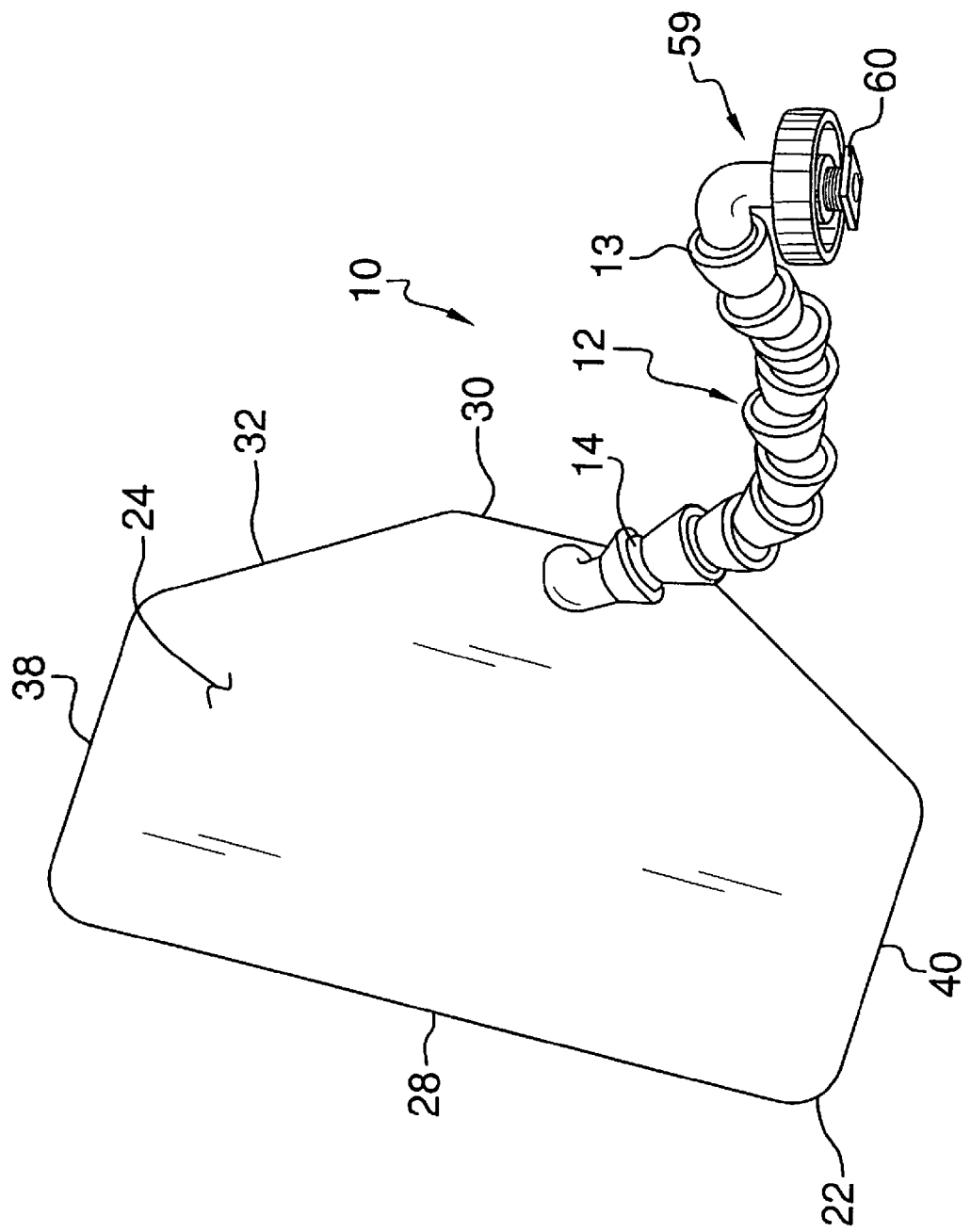
FIG. 2 is a bottom perspective view of an embodiment of the disclosure.

With reference now to the drawings, and in particular to FIGS. 1 through 7 thereof, a new lens shade device embodying the principles and concepts of an embodiment of the disclosure and generally designated by the reference numeral 10 will be described.

As best illustrated in FIGS. 1 through 7, the camera lens shade assembly 10 generally comprises an attachment configured for engaging an existing image capturing device 80, such as a camera. The image capturing device 80 may comprise any device configured for capturing an image. Therefore, the image capturing device may include a camera configured for taking photographs or video. It should be understood that such cameras may utilize film or digital media for storing images. Thus, while the assembly 10 may be particularly well adapted for cameras having a hot shoe mount 82 for reasons disclosed below, the assembly 10 may be used also with video cameras or any imaging device such as a camera mounted on a cellular phone. The hot shoe mount 82 is conventional in the art of cameras and is typically used to receive and electrically couple a flash unit to a camera configured for capturing still photographs.

The present camera lens shade assembly 10 includes a bendable elongated member 12 having a first end 13 and a second end 14 that are selectively positionable with respect to each other. The elongated member 12 may be formed of a plurality of ball and socket members 16. An attachment member 59 which may comprise a shoe base 60 is attached to the first end 13 of the elongated member 12. The shoe base 60 removably attaches to the hot shoe mount 82. To the second end 14 of the elongated member 12 is attached a shade 22. The shade 22 is positionable by manipulating the elongated member 12 such that it will prevent light from any selected light source, and in particular sunlight, from directly entering the lens 83 of the image capturing device 80.

The shade 22 has a first side 24 and a second side 26. With respect to the elongated member 12, the shade 22 includes a distal end 28, a proximal end 30, a first lateral edge 38, and a second lateral edge 40. Though any shape may be utilized, the shade 22 may have an irregular hexagonal shape having the distal end 28 being a longest edge of the shade 22 may provide benefits with respect to easy positioning of the shade 22 such that it effectively provides shade for the lens while remaining lightweight and not interfering with a view of the lens 83. The shade 22 may be formed from a lightweight material, including aluminum, other metals, or plastic. Though the shade 22 may be comprised of a rigid or resiliently bendable material, the shade 22 may also be comprised of a material which allows the shade 22 to be bent into a particular shape.

The second end 14 of the elongated member 12 may be rotatably attached to the shade 22 and the first end 13 of the elongated member 12 may be multi-directionally rotatably attached to the shoe base 60. The shoe base 60 includes a rod 61 which terminates in a plate 62 positioned opposite of the first end 13. The plate 62 is slidably engageable with a conventional hot shoe mount 82. Hot shoe mounts 82 conventionally include a pair of spaced receivers into which opposite edges of the plate 62 may be extended. A stop 63 is rotatably and threadably coupled to the rod 61. The stop 63, in conventional manner, is moved downwardly toward the plate 62 to frictionally engage and retain the hot shoe mount 82 between the plate 62 and the stop 63. In this manner, the stop 63 secures the plate 62 to the hot shoe mount 82 as would a flash unit typically be held in place. The stop 63 includes a grip for assisting a person in rotating the stop 63 such that it can be selectively moved toward or away from the plate 62. As shown in the Figures, the rod 61 may have a bend 64 therein between the stop 63 and the first end 13. The bend 64 may be an approximately a 90° bend.

It should be understood that other means of attachment may be employed other than the shoe base 60. Therefore, the attachment member 59 may include conventional attachment means such as adhesives, clamps and the like which would allow for engagement of the elongated member to any position on the image capturing device 80. One particular attachment means located at a central end area of the shoe base 60, or more particularly in the central area of the plate 62, may include what is known as a ¼"-female receptacle 65 to engage a ¼"-20 male mount. This will allow attachment to many cameras which include ¼"-20 receptacles for screw mount options. Such alternate attachment means would not only allow for the elongated member 12 to be attached to any image capturing device 80, but more particularly would allow the elongated member 12 to be attached to a camera which does not include a hot shoe mount 82. Consequently, alternate attachment means would facilitate conventional use of the hot shoe mount 82 with a flash unit.

Figure 3:
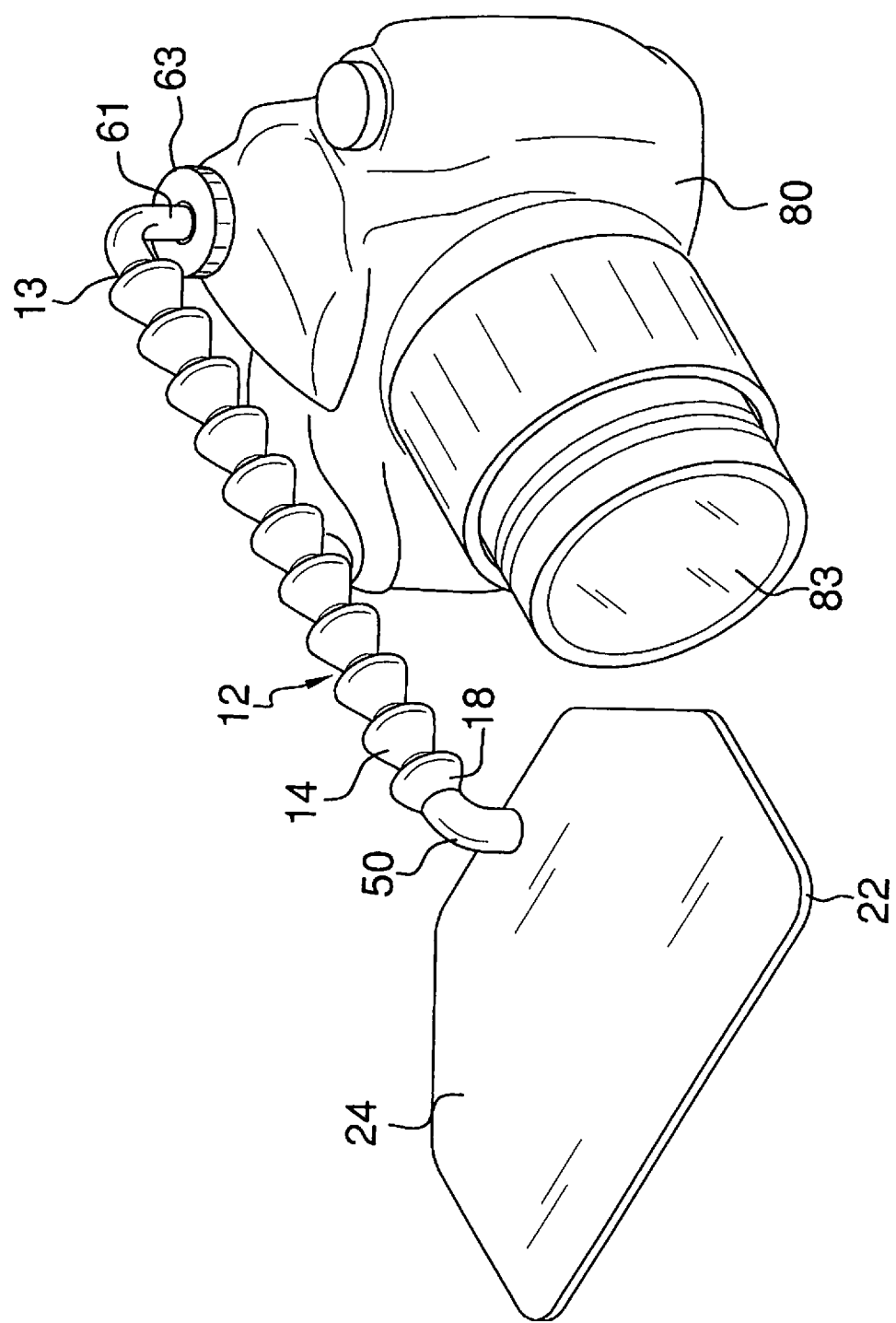
FIG. 3 is a top perspective view of an embodiment of the disclosure.
Figure 4:
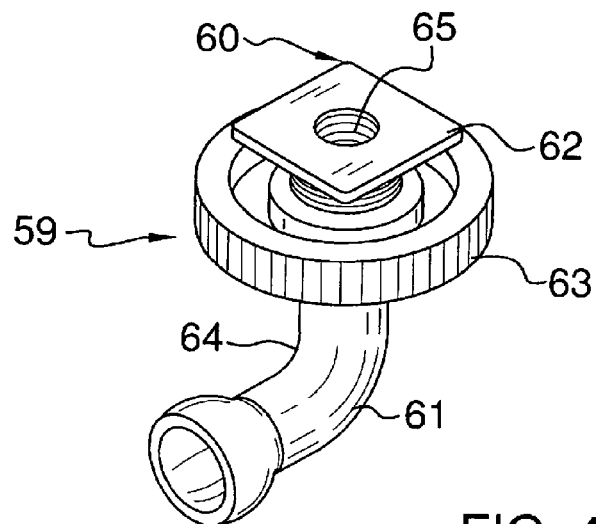
FIG. 4 is a bottom perspective view of an embodiment of an attachment member of the disclosure.
Figure 5:
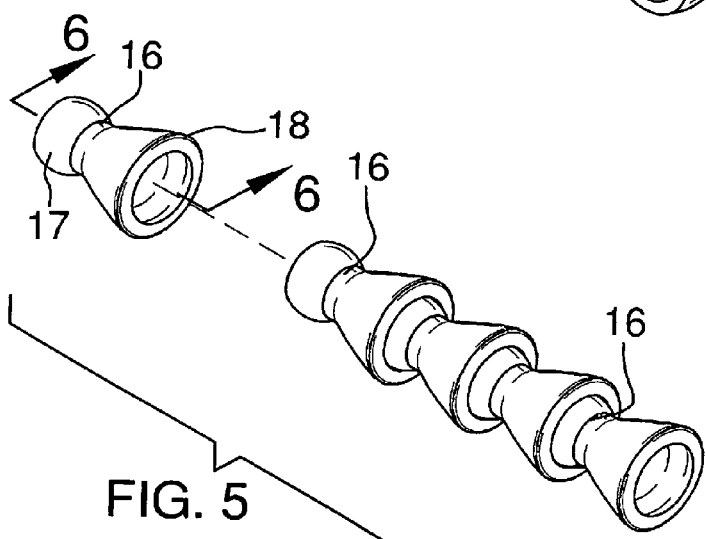
FIG. 5 is a perspective view of an elongated member of an embodiment of the disclosure.
Figure 6:
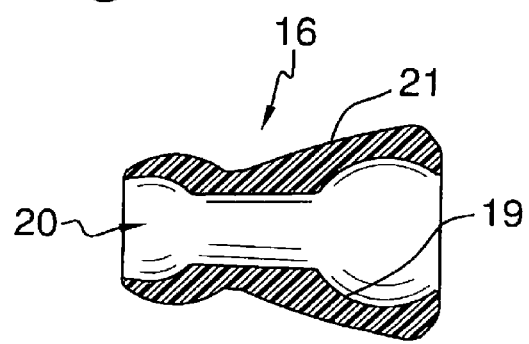
FIG. 6 is a cross-sectional view of an embodiment of the disclosure taken along line 6-6 of FIG. 5.
Figure 7:
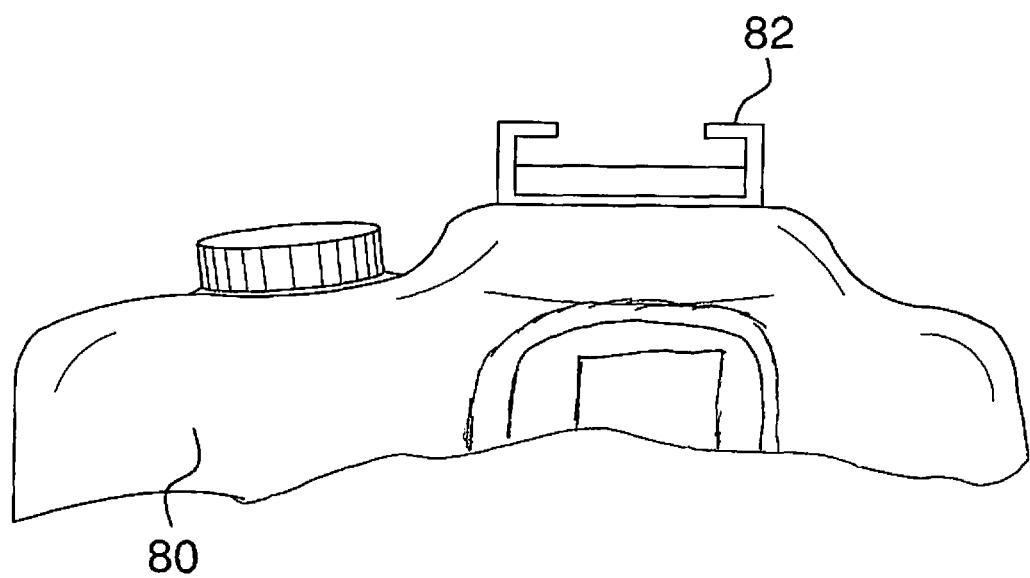
FIG. 7 is a rear view of a camera hot shoe mount of an embodiment of the disclosure.

Each of the ball and socket members 16 includes a male section 17 and a female section 18 non-removably attached to each other to allow the ball and socket members 16 to be removably coupled to each other. The ability to attach or remove a male section 17 of one socket member 16 from a female sections 18 of anther socket member 16 allows a user of the assembly 10 to selectively increase or decrease the length of the elongated member 12. Each male section 17 may comprise a spheroid and each female section 18 may comprise a well having a concavely arcuate inner surface 19 to allow the male 17 and female 18 sections to rotate and pivot freely when coupled to each other. As can be seen in FIGS. 5 and 6, a free end of the male sections 17, opposite the female sections 18, may be planar and have an opening 20 extending therein. As can be seen in FIG. 6, opening 20 may extend into the female section 18 to fluidly couple together an interior of the male 17 and female sections 18. Such a structure facilitates the insertion or removal of the male sections 17 into the female sections 18. The female sections 18 may each have a frusto-conical outer surface 21 and having an increasing width as they extend away from associated ones of the male sections 17. In particular, the female sections 18 may have a width less than a width of the male sections 18 where the two are non-removably joined together. This ensures that the outer surfaces 21 of the female sections 18 do not interfere with each other as the ball and socket members 16 are manipulated. As can be seen in FIG. 3, the shade 22 may include a post 50 terminating with a female section 18 for attachment to the elongated member 12. The post 50 may also include a bend 51, which may be an approximately a 90° bend, corresponding to the bend 64 in the rod 61 such that the plate 62 and the shade 22 may lie in planes oriented parallel to each other the elongated member 12 is straight and aligned with an axis of the lens 83. The ball and socket members 16 are comprised of any suitable material and plastic and elastomeric materials may in particular be utilized.

In use, the elongated member 12 is attached to the image capturing device 80 so that the ball and socket members 16 may be manipulated with respect to each other as needed to shade the lens of the image capturing device 80 from a light source. In addition to the elongated member 12 having an adjustable length, the ball and socket members 16 allow the shade 22 to be rotated and moved to any selected position relative to the image capturing device 80. This will provide the required placement of the shade 22 as needed depending on the source of the light. If needed, the elongated member 12 may first be extended or shorted to accommodate a particular shading task. This may be accomplished before or after the shoe base 60 is engaged with the hot shoe mount 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A camera lens shading assembly configured for being mounted to an image capturing device, said assembly including:
    an elongated member having a first end and a second end, said elongated member being bendable such that first and second ends are selectively positionable with respect to each other, said elongated member being comprised of a plurality of ball and socket members;
    an attachment member being attached to said first end of said elongated member, said attachment member being configured to be removably coupled to an image capturing device, said attachment member includes a shoe base being attached to said first end of said elongated member, said shoe base being configured to releasably attached to a hot shoe mount of the image capturing device said shoe base including a rod terminating in a plate positioned opposite of the first end, said plate being configured to be slidably engageable with a hot shoe mount, said rod having a bend therein between said stop and said first end; and
    a shade being attached to said second end of said elongated member, said shade being selectively positionable relative to a lens of the image capturing device to inhibit light from a selected light source from directly entering the lens.

2. The camera lens shading assembly according to claim 1, wherein said shade has a first side and a second side, said shade including a distal end, a proximal end, a first lateral edge, and a second lateral edge with respect to said second end of said elongated member, said shade having a hexagonal shape.

3. The camera lens shading assembly according to claim 1, wherein said second end of said elongated member is rotatably attached to said shade.

4. The camera lens shading assembly according to claim 1, wherein said first end of the elongated member being multi-directionally rotatably attached to said attachment member.

5. The camera lens shading assembly according to claim 1, wherein a stop is rotatably and threadably coupled to said rod, said stop being rotated in a first direction to be moved downwardly toward said plate releasably engage and retain the hot shoe mount between said plate and said stop, said stop including a grip for facilitating rotation of said stop.

6. The camera lens shading assembly according to claim 1, wherein each of said ball and socket members includes a male section and a female section attached to each other to allow said ball and socket members to be removably coupled to each other, wherein a length of said elongated member is selectively altered by adding or removing individual ones of said ball and socket member.

7. The camera lens shading assembly according to claim 6, wherein each male section comprises a spheroid and each female section comprising a well having a concavely arcuate inner surface to allow said male and female sections to rotate and pivot freely with respect to each other.

8. The camera lens shading assembly according to claim 7, wherein a free end of each of said male sections is defined positioned opposite of an associated one of said female sections, said free end of each of said male sections being planar and having an opening extending therein to facilitate insertion and removal of said male sections from said female sections.

9. The camera lens shading assembly according to claim 8, wherein said female sections each have a frusto-conical outer surface and having an increasing width as said female sections extend away from associated ones of said male sections, said female sections each having a width less than a width of associated ones of said male sections where said female and male sections are joined together.

10. The camera lens shading assembly according to claim 1, wherein said shade includes a post terminating with a female section for attachment to said elongated member, said post having a bend therein corresponding to said bend in the rod such that said plate and said shade lie in planes oriented parallel to each other when said elongated member is straight and aligned with an axis of said lens.

11. The camera lens shading assembly according to claim 1, wherein said attachment member includes a ¼"-20 female receptacle configured for engaging a ¼"-20 male mount.

12. A camera lens shading assembly configured for being mounted to an image capturing device, said assembly including:

an elongated member having a first end and a second end, said elongated member being bendable such that first and second ends are selectively positionable with respect to each other, said elongated member being comprised of a plurality of ball and socket members;

an attachment member being attached to said first end of said elongated member, said attachment member being configured to be removably coupled to an image capturing device;

said attachment member including a shoe base being attached to said first end of said elongated member, said shoe base being configured to releasably attached to a hot shoe mount of the image capturing device;

a shade being attached to said second end of said elongated member, said shade being selectively positionable relative to a lens of the image capturing device to inhibit light from a selected light source from directly entering the lens;

said shade having a first side and a second side, said shade including a distal end, a proximal end with respect to said second end of said elongated member;

said second end of said elongated member being rotatably attached to said shade;

said first end of the elongated member being multi-directionally rotatably attached to said attachment member;

said shoe base including a rod terminating in a plate positioned opposite of the first end, said plate being configured to be slidably engageable with a hot shoe mount, a stop being rotatably and threadably coupled to said rod, said stop being rotated in a first direction to be moved downwardly toward said plate releasably engage and retain the hot shoe mount between said plate and said stop, said stop including a grip for facilitating rotation of said stop;

said rod having a bend therein between said stop and said first end;

each of said ball and socket members including a male section and a female section attached to each other to allow said ball and socket members to be removably coupled to each other, wherein a length of said elongated member is selectively altered by adding or removing individual ones of said ball and socket member, each male section comprising a spheroid and each female section comprising a well having a concavely arcuate inner surface to allow said male and female sections to rotate and pivot freely with respect to each other;

a free end of each of said male sections is defined positioned opposite of an associated one of said female sections, said free end of each of said male sections being planar and having an opening extending therein to facilitate insertion and removal of said male sections from said female sections;

said female sections each have a frusto-conical outer surface and having an increasing width as said female sections extend away from associated ones of said male sections, said female sections each having a width less than a width of associated ones of said male sections where said female and male sections are joined together; and said shade including a post terminating with a female section for attachment to said elongated member, said post having a bend therein corresponding to said bend in the rod such that said plate and said shade lie in planes orientated parallel to each other when said elongated member is straight and aligned with an axis of said lens.

* * * * *